(12) United States Patent
Ito

(10) Patent No.: US 6,584,322 B1
(45) Date of Patent: Jun. 24, 2003

(54) DEVICE FOR AND METHOD OF PROCESSING INFORMATION

(75) Inventor: Takashi Ito, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/530,488

(22) PCT Filed: Sep. 1, 1998

(86) PCT No.: PCT/JP98/03900

§ 371 (c)(1), (2), (4) Date: Apr. 28, 2000

(87) PCT Pub. No.: WO00/13090

PCT Pub. Date: Mar. 9, 2000

(51) Int. Cl.[7] .................................. H04Q 7/20
(52) U.S. Cl. ........................ 455/466; 455/566
(58) Field of Search ................. 455/414, 415, 455/422, 517, 466, 566, 550; 370/401

(56) References Cited

U.S. PATENT DOCUMENTS 6,112,099 A * 8/2000 Ketola .................... 370/252
6,188,909 B1 * 2/2001 Alanara et al. ............. 455/466

FOREIGN PATENT DOCUMENTS

| JP | 9-162818 | 6/1997 |
| JP | 9-259025 | 10/1997 |
| JP | 10-98706 | 4/1998 |
| JP | 10-116220 | 5/1998 |
| JP | 10-126334 | 5/1998 |
| JP | 10-171705 | 6/1998 |

* cited by examiner

Primary Examiner—Vivian Chin
Assistant Examiner—Tu X Nguyen
(74) Attorney, Agent, or Firm—Sughrue Mion, PLLC (57) ABSTRACT

An information processing device determines whether or not it is difficult to use a digital mobile telephone (8) when retrieving second information associated with first information. The information processing device can allow a user to manipulate and cause the information processing device to retrieve the second information associated with the first information only if the digital mobile telephone (8) is available, thus preventing the user from performing extra manipulations when the digital mobile telephone (8) is not available, such as when the user intends not to use the digital mobile telephone (8).

8 Claims, 5 Drawing Sheets

⟨html⟩

⟨head⟩

⟨title⟩ initial screen ⟨/title⟩

⟨/head⟩

⟨body⟩

⟨center⟩ ⟨p⟩ ⟨H3⟩ Initial Screen ⟨/H3⟩ ⟨/p⟩ ⟨/center⟩

⟨p⟩ ⟨/p⟩

⟨p⟩ ⟨/p⟩

⟨p⟩ This screen is a sample. On the screen, various types of information can be displayed. ⟨/p⟩

⟨p⟩ ⟨/p⟩

⟨p⟩ Today, we televise a ⟨a href="http://www. xxx. xxx/aaa/yakyuu. html"⟩ baseball game ⟨/a⟩ . Why don't you watch the TV program while having a ⟨a href="http://www. xxx. xxx/aaa/beer. html"⟩ beer ⟨/a⟩ ? ⟨/p⟩

⟨/body⟩

⟨/html⟩

⟨html⟩

⟨head⟩

⟨title⟩ baseball game ⟨/title⟩

⟨/head⟩

⟨body⟩

⟨center⟩ ⟨p⟩ ⟨H3⟩ Baseball Game ⟨/h3⟩ ⟨/p⟩ ⟨/center⟩

⟨p⟩ ⟨/p⟩

⟨p⟩ A baseball game's TV program goes on the air at 6 o'clock on this cannel. ⟨/p⟩

⟨p⟩ Please watch the TV program. ⟨/p⟩

⟨/body⟩

⟨/html⟩

Initial Screen ~4A

This screen is a sample. On the screen, various types of information can be displayed.

Today, we televised a 
Why don't you watch the TV program while having a beer?

FIG.10

Initial Screen ~4A

This screen is a sample. On the screen, various types of information can be displayed.

Today, we televised a 
Why don't you watch the TV program while having a beer ?

DEVICE FOR AND METHOD OF PROCESSING INFORMATION

FIELD OF THE INVENTION

The present invention relates to an information processing device for and method of displaying a text or image corresponding to information obtained by way of a specific communications channel or from a specific storage medium.

DESCRIPTION OF THE PRIOR ART

Figure 1:
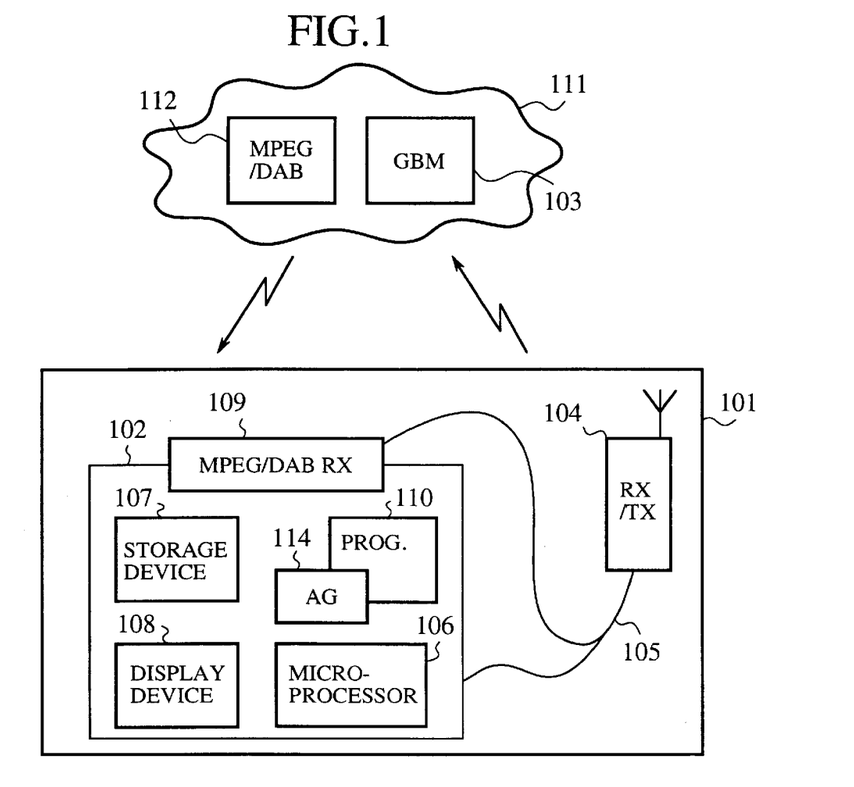
FIG. 1 is a block diagram showing a prior art information processing device.

Referring next to FIG. 1, there is illustrated a block diagram showing a prior art information processing device as disclosed in, for example, Japanese Patent Application Publication (TOKKAIHEI) No.10-98706. In the figure, reference numeral 101 denotes multimedia terminal equipment comprised of a receiver 102 for use with a unidirectional broadcasting system and a terminal device 104 for use with a bidirectional communications- system, the receiver 102 and the terminal device 104 being connected to each other by way of local communications links 105.

The receiver 102 of the multimedia terminal equipment 101 consists of a microprocessor 106 for controlling the operation of the receiver 102, a storage device 107 such as a semiconductor memory, a display device 108 such as a CRT, a receiving unit 109 for receiving MPEG or DAB data 112 transmitted thereto through a television network disposed as one communications network 111, and so on. An application program 110 to be processed by the microprocessor 106 is stored in a given storage unit of the receiver 102. Reference numeral 114 denotes an agent that is to be executed under the application program 110. The terminal device 104 is a terminal for use with a bidirectional communications system such as a GSM telephone network included with a digital cellular communications network 103 disposed as one communications network 111.

Next, a description will be made as to the operation of the prior art information processing device.

The receiving unit 109 of the receiver 102 receives data 112 transmitted thereto. The received data 112 is then stored in the storage device 107 and is analyzed according to the application program 110 by the microprocessor 106. Information corresponding to the data is then displayed on the screen of the display device 108.

When the user who recognizes the information displayed on the screen of the display device 108 wants to acquire or retrieve other information associated with the on-screen information, the user can manipulate the terminal device 104. The terminal device 104 can retrieve the other information associated-with the on-screen information through the digital cellular communications network 103 disposed as one communications network 111 according to the user's manipulation. The retrieved information is then furnished, by way of a local communications link 105, to the receiver 102, and is displayed on the screen of the display device 108.

The microprocessor 106 checks resources such as the storage device 107 and the terminal device 104. When the microprocessor 106 determines that it is difficult to reserve sufficient resources required to perform a certain process, it displays the fact, as a warning for the user, on the screen of the display device 108.

Since a prior art information processing device is constructed as above, the problem has arisen that when the user wants to retrieve information associated with the on-screen information even though it is difficult to use the terminal device 104, the user has to perform complicated manipulations according to a warning on-screen. Even though the user turns off the terminal device 104 or does not use it with intention not to use it, the user has to perform complicated manipulations according to a warning on-screen.

The present invention is proposed to solve the above problem of the prior art and has the object of providing an information processing device and method capable of determining whether or not it is difficult to use a terminal device in advance when retrieving information associated with on-screen information, and allowing a user to manipulate and cause the information processing device to retrieve the information associated with the on-screen information only if the terminal device is available, thus preventing the user from performing extra manipulations when the terminal device is not available, such as when the user turns off or does not use the terminal device with intention not to use it.

DISCLOSURE OF THE INVENTION

In accordance with a first aspect of the present invention, there is provided an information processing device that determines whether or not information can be transmitted or received through a transmit/receive means for transmitting or receiving information by way of a second predetermined communications channel, provides guidance on manipulation to cause the transmit/receive means to transmit or receive information for a user only if information can be transmitted or received through the transmit/receive means, and controls the transmit/receive means according to the user's manipulation to retrieve second information associated with first information by way of the second communications channel. Accordingly, when the transmit/receive means is not available, the information processing device does not provide guidance on manipulation to cause the transmit/receive means to retrieve the second information for a user. The information processing device therefore makes it possible to prevent the user from performing extra manipulations when the transmit/receive means is not available, such as when the user intends not to use the transmit/receive means.

In accordance with a second aspect of the present invention, there is provided an information processing device that determines whether or not information can be transmitted or received through a transmit/receive means for transmitting or receiving information by way of a second predetermined communications channel, when displaying a text or image corresponding to information indicating a storage location where second information included with and associated with first information is stored on a display, displays the text or image corresponding to the information indicating the storage location where the second information is stored in a first predetermined format unless information can be transmitted or received through the transmit/receive means, displays the text or image corresponding to the information indicating the storage location where the second information is stored in a second predetermined format different from the first format otherwise, and, when the text or image displayed in the second format is selected, controls the transmit/receive means to retrieve the second information based on the information indicating the storage location corresponding to the selected text or image. Accordingly, when the transmit/receive means is not available, the information processing device does not provide guidance on manipulation to cause the transmit/receive means to retrieve the second information for a user. The information processing device therefore makes it possible to prevent the user from performing extra manipulations when the transmit/ receive means is not available, such as when the user intends not to use the transmit/receive means.

In accordance with a third aspect of the present invention, the information processing device receives the first information transmitted thereto by a digital broadcast disposed as the first communications channel, and transmits or receives information by way of a digital mobile telephone network disposed as the second communications channel. In this way, the information processing device can retrieve information by way of the radio communications channels. It is therefore possible to mount the information processing device on a motor vehicle.

In accordance with a fourth aspect of the present invention, the information processing device processes the first and second information written in Hyper, Text Markup Language or HTML. When information can be transmitted or received through the transmit/receive means, the second information is displayed in a format which is the same as that of a hypertext link defined by HTML. In this way, since the information processing device can process information written in HTML, the information processing device can provide information stored in any WWW site for the user.

In accordance with a fifth aspect of the present invention, there is provided an information processing method including the steps of determining whether or not information can be transmitted or received through a transmit/receive means for transmitting or receiving information by way of a second predetermined communications channel, providing guidance on manipulation to cause the transmit/receive means to transmit or receive information for a user only if information can be transmitted or received through the transmit/receive means, and controlling the transmit/receive means according to the user's manipulation to retrieve second information associated with the first information by way of the second communications channel. Accordingly, when the transmit/receive means is not available, the information processing method does not provide guidance on manipulation to cause the transmit/receive means to retrieve the second information for a user. The information processing method therefore makes it possible to prevent the user from performing extra manipulations when the transmit/receive means is not available, such as when the user intends not to use the transmit/receive means.

PREFERRED EMBODIMENTS OF THE INVENTION

In order to explain the invention in greater detail, the preferred embodiments will be explained below with reference to the accompanying figures.

EMBODIMENT 1

Figure 2:
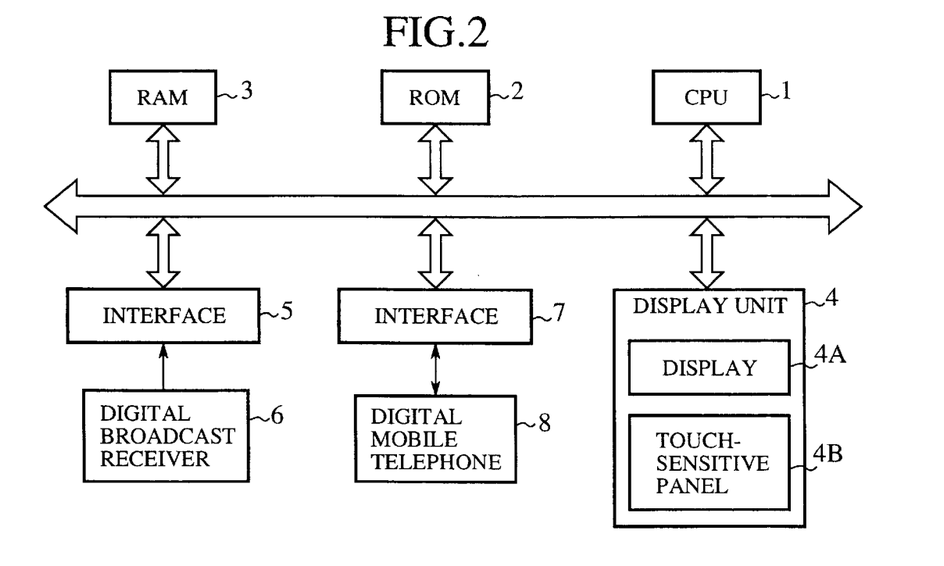
FIG. 2 is a block diagram showing the structure of an information processing device according to a first embodiment of the present invention.

Referring next to FIG. 2, there is illustrated a block diagram showing the structure of an information processing device according to a first embodiment of the present invention. In the figure, reference numeral 1 denotes a Central Processing Unit or CPU (determination means, enabling means, information retrieving means, display control means, and transmit/receive control means), numeral 2 denotes a Read Only Memory or ROM for prestoring a program and data to be processed by the CPU 1, and numeral 3 denotes a Random Access Memory or RAM for temporarily storing data and a program when the CPU 1 carries out a process.

Reference numeral 4 denotes a display unit provided with a display 4A for displaying an image and/or a text, which correspond to data furnished by the CPU 1, on the screen thereof, and a touch-sensitive panel (manipulation means) 4B constructed of a transparent material, for allowing the CPU to identify on-screen data by telling the CPU which position on the touch-sensitive panel was pressed by a specific member, such as a pen, or a user's finger.

Reference numeral 6 denotes a digital broadcast receiver (digital broadcast receiving means) for receiving data transmitted thereto by a digital broadcast that conforms to a predetermined standard, and for furnishing the received data, by way of an interface 5, to the CPU 1, and numeral 8 denotes a digital mobile telephone (transmitter/receiver means) that can transmit or receive various types of data under control of the CPU 1 so as to acquire or retrieve various types of information.

In the information processing device of the first embodiment, both data transmitted thereto by a digital broadcast that conforms to a predetermined standard and data received by the digital mobile telephone 8 are written in Hyper Text Markup Language or HTML.

Next, a description will be made as to the operation of the information processing device of this embodiment.

Figure 3:
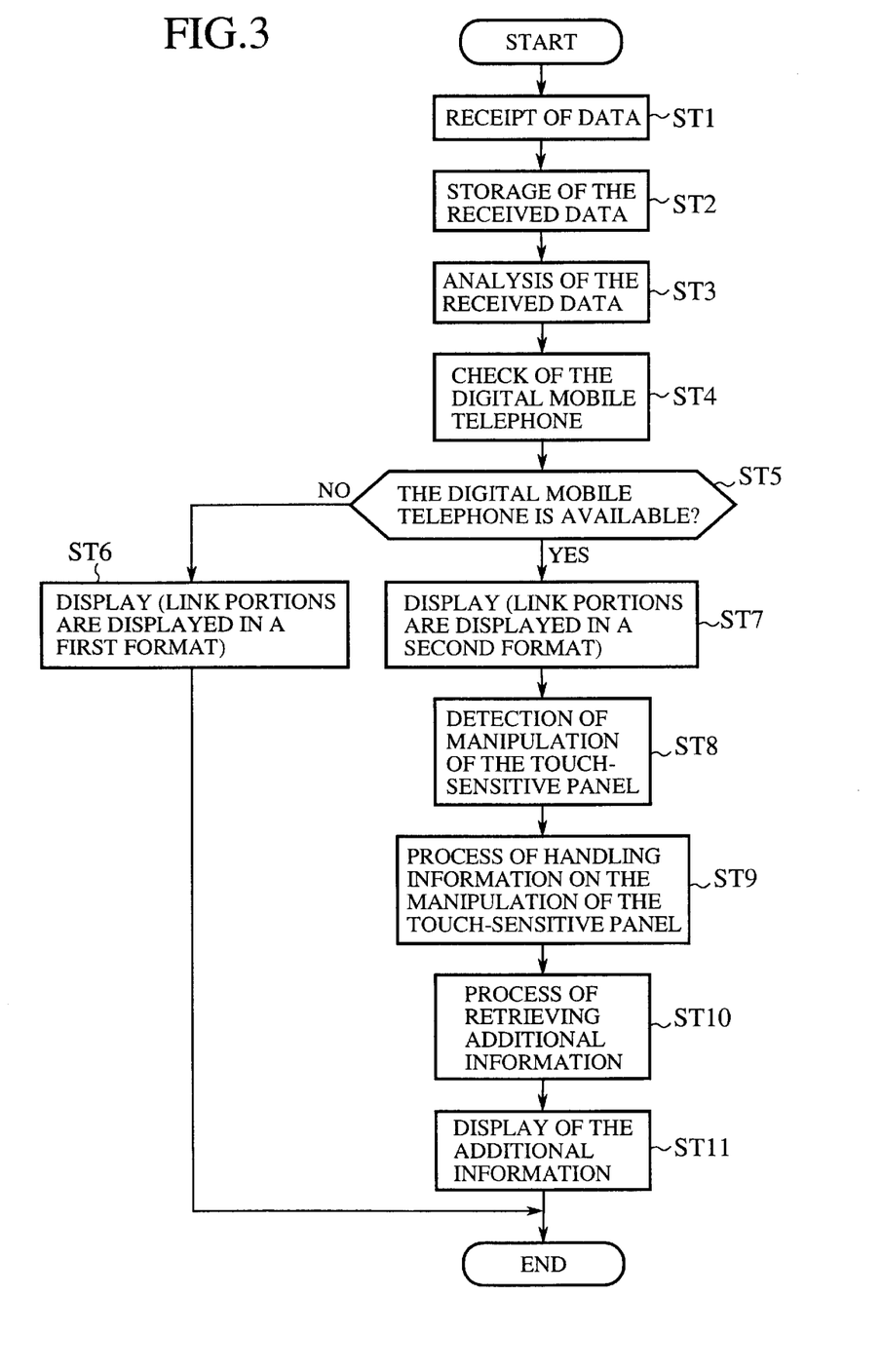
FIG. 3 is a flow diagram showing the operation of the information processing device according to the first embodiment of the present invention.
Figure 4:
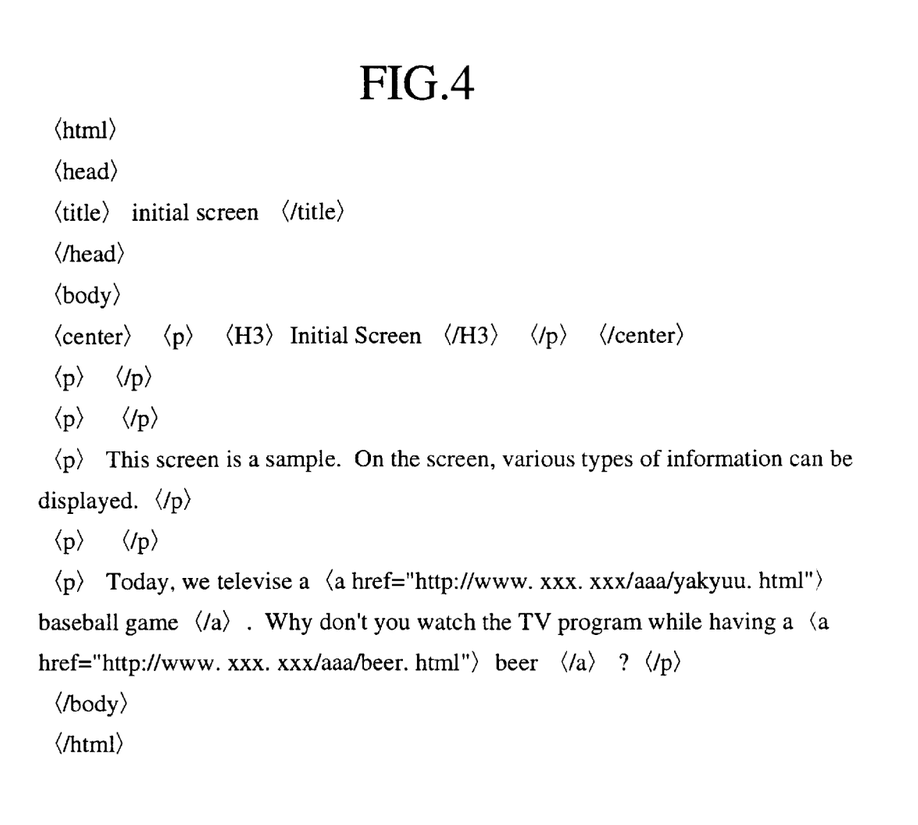
FIG. 4 is a diagram showing an example of data transmitted by a digital broadcast that conforms to a predetermined standard.
Figure 5:
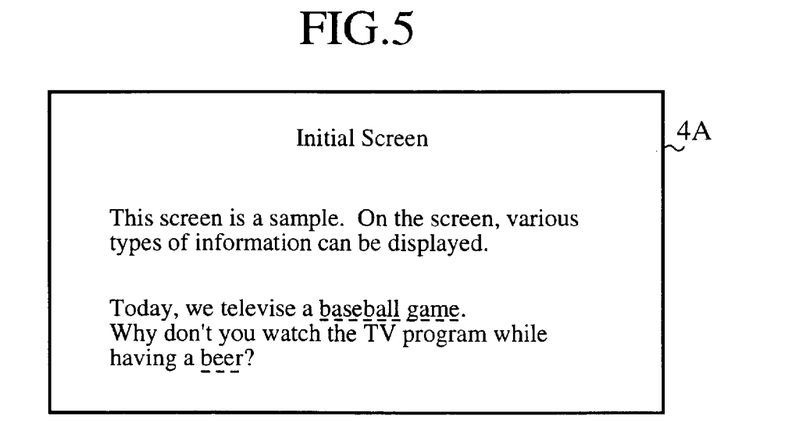
FIG. 5 is a diagram showing an example of screen display in which link portions included with the exemplary data as shown in FIG. 4 are shown in a first format.
Figure 6:
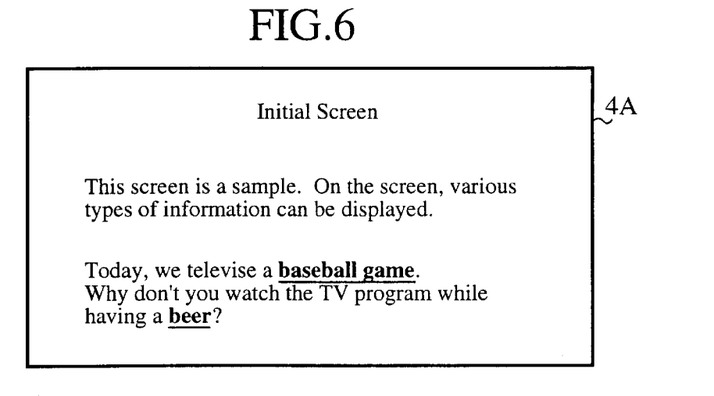
FIG. 6 is a diagram showing another example of screen display in which link portions included with the exemplary data as shown in FIG. 4 are shown in a second format.
Figure 7:
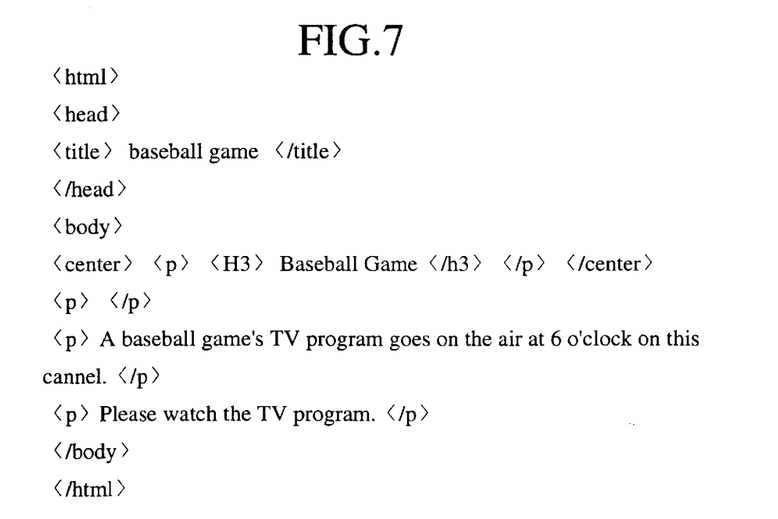
FIG. 7 is a diagram showing an example of data retrieved by controlling a digital mobile telephone.
Figure 8:
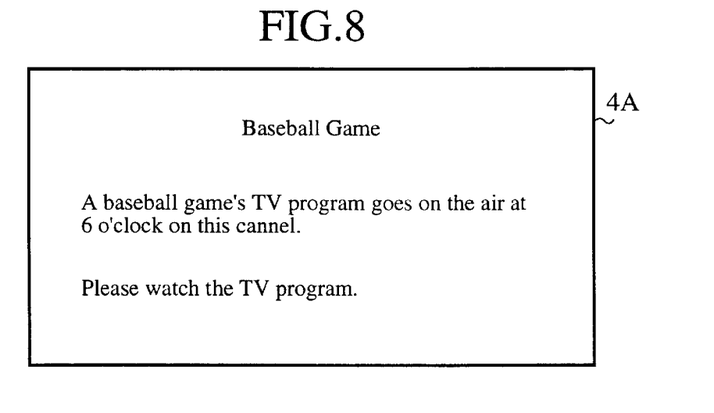
FIG. 8 is a diagram showing an example of screen display in which a text corresponding to the exemplary data as shown in FIG. 7 is shown.

Referring next to FIG. 3, there is illustrated a flow diagram explaining the operation of the information processing device of the first embodiment. FIG. 4 shows an example of data broadcast by a digital broadcast that conforms to a predetermined standard. FIG. 5 shows an example of screen display in which link portions included with the exemplary data as shown in FIG. 4 are shown in a first format, and FIG. 6 shows another example of screen display in which link portions included with the exemplary data as shown in FIG. 4 are shown in a second format. FIG. 7 shows an example of data received by the digital mobile telephone 8, and FIG. 8 shows an example of screen display in which a text corresponding to the exemplary data as shown in FIG. 7 is shown.

The digital broadcast receiver 6, in step ST1, receives data transmitted thereto by the digital broadcast that conforms to a predetermined standard and then furnishes the received data, by way of the interface 5, to the CPU 1. The CPU1 then, in step ST2, stores the received data in the RAM 3. The data, which has been transmitted to the information processing device by the digital broadcast that conforms to a predetermined standard, is written in HTML and is a plain-text file as shown in FIG. 4, for example.

The CPU 1 then, in step ST3, converts the received data written in HTML into data in a specific format that can be displayed on the display 4A according to a convert program based on HTML specifications (e.g., HTML 3.2 Reference Specification REC-html32 issued by World Wide Web Consortium), such as a World Wide Web or WWW browser.

For example, a text placed between <center> and </center> tags, which are included with the data as shown in FIG. 4, is horizontally centered on-screen, and a text placed between <h3> and </h3> tags is displayed in a larger font.

The CPU 1 then, in step ST4, checks whether or not the digital mobile phone 8 is available through the interface 7. For example, the CPU 1 transmits a reset signal, by way of the interface 7, to the digital mobile phone 8. The CPU 1 then checks whether it has established connection with the digital mobile phone 8 according to whether or not a reset completion signal that responds to the reset signal from the digital mobile phone 8 has been transmitted thereto during a predetermined period of time. Further, the CPU 1 transmits a control signal for causing the digital mobile telephone 8 to notify the transmit/receive strength of the radio wave to the digital mobile telephone 8, and then checks the status of the digital mobile phone 8 according to a response signal that responds to the control signal.

The CPU 1, in step ST5, determines whether or not the digital mobile telephone 8 is available based on the checking result. When the CPU 1 determines that the digital mobile phone 8 is not available, it advances to step ST6 where it converts display data corresponding to link portions included with the received data written in HTML into display data in a first predetermined format, and then display an image or text corresponding to the display data in the first predetermined format as well as another image and/or text included with the received data on the display 4A of the display unit 4.

For example, the data as shown in FIG. 4 includes a hypertext link (or link): <a href="http://www.xxx.xxx/aaa/yakyuu.html"> baseball game </a>, and another link: <a href="http://www.xxx.xxx/aaa/beer.html"> beer </a>. The first link hyperlinks data stored in a WWW site identified by a Uniform Resource Locator or URL: http://www.xxx.xxx/aaa/yakyuu.html to the text "baseball game", and the second link hyperlinks data stored in a WWW site identified by a URL: http://www.xxx.xxx/aaa/beer.html to the text "beer".

When the data as shown in FIG. 4 has been received and the CPU determines that the digital mobile telephone 8 is not available, the texts corresponding to the links can be highlighted with dashed underlines according to the first format, as shown in FIG. 5, for example.

On the other hand, when the CPU 1 determines that the digital mobile telephone 8 is available, it, in step ST7, displays an image and/or test corresponding to the data into which the received data has been converted in step ST3 on the display 4A of the display unit 4. In this case, the texts corresponding to the links included with the received data are displayed in a second format.

When the data as shown in FIG. 4 has been received and the CPU determines that the digital mobile telephone 8 is available, the texts (or link portions) corresponding to the links can be highlighted with solid underlines and in a bold font according to the second format, as shown in FIG. 6, for example.

When the user presses part of the touch-sensitive panel 4B corresponding to one of the link portions included with the image and/or text displayed in step ST7, the touch-sensitive panel 4B which is laid over the screen of the display 4A can detect the position of the panel pressed by the user and then furnishes data indicating the position to the CPU 1.

When the CPU 1 then, in step ST9, receives the data indicating the pressed position of the touch-sensitive panel, it can determine that the corresponding link portion displayed on the display 4A identified by the data was pressed. If other part of the touch-sensitive panel, which is not associated with any link, was pressed, the CPU 1 does not do anything and waits for next data indicating a pressed position because no link is identified by the received data indicating the pressed position. When the digital mobile telephone 8 is not available, the CPU 1 does not do anything and waits for next data indicating a pressed position even though the user has pressed part of the touch-sensitive panel corresponding to a link.

The CPU 1 then, in step ST10, controls the digital mobile telephone 8 by way of the interface 7 so as to retrieve data stored in a WWW site identified by a Uniform Resource Locator or URL corresponding to the selected link according to the Hyper Text Transfer Protocol or HTTP, and then stores the retrieved data in the RAM 3. The data which has been retrieved by the CPU while controlling the digital mobile telephone 8 can be written in HTML. For-example, when part of the on-screen data corresponding to the link: <a href="http://www.xxx.xxx/aaa/yakyuu.html"> baseball program </a> is selected by the user, text data as shown in FIG. 7 can be retrieved.

The CPU,1 then, in step ST11, displays an image and/or text corresponding to the retrieved data on the display 4A of the display unit 4.

For example, when the CPU retrieves the data as shown in FIG. 7, a text, as shown in FIG. 8, corresponding to the retrieved data is displayed.

As previously mentioned, in accordance with the first embodiment of the present invention, the information processing device can determine whether or not information can be transmitted or received through the digital mobile telephone 8. Further, when the digital mobile telephone 8 is not available for transmitting or receiving information, the information processing device can display an text or image, which corresponds to information indicating a storage location for storing second information included with first information received by the digital broadcast receiver 6, in a first predetermined format on the display 4A. Otherwise, that is, when the digital mobile telephone 8 is available for transmitting or receiving information, the information processing device can display the text or image, which corresponds to the information indicating the storage location for storing the second information, in a second predetermined format different from the first format on the display 4A. When the text or image displayed in the second format is further selected by the user, the information processing device controls the digital mobile telephone 8 so as to retrieve the second information based on the information indicating the storage location corresponding to the selected text or image. Accordingly, when the digital mobile telephone 8 is not available, the information processing device does not make a screen display to allow the user to cause the information processing device to retrieve the second information. This embodiment thus offers the advantage of being able to prevent the user from performing extra manipulations when the digital mobile telephone 8 is not available, for example, when the user turns off or does not use the digital mobile telephone 8 with intent not to use it.

For example, when the information processing device of the first embodiment is mounted on a motor vehicle, the driver can concentrate his or her attention on the driving without having to perform complicated manipulations on the information processing device when the digital mobile telephone 8 is not available.

EMBODIMENT 2

Figure 9:
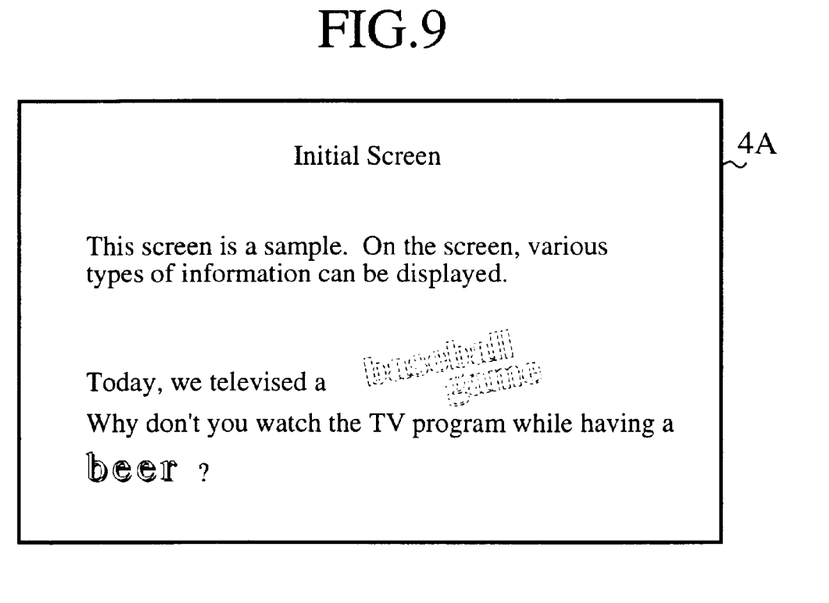
FIG. 9 is a diagram showing another example of screen display in which link portions included with the exemplary data as shown in FIG. 4 are shown in the first format.
Figure 10:
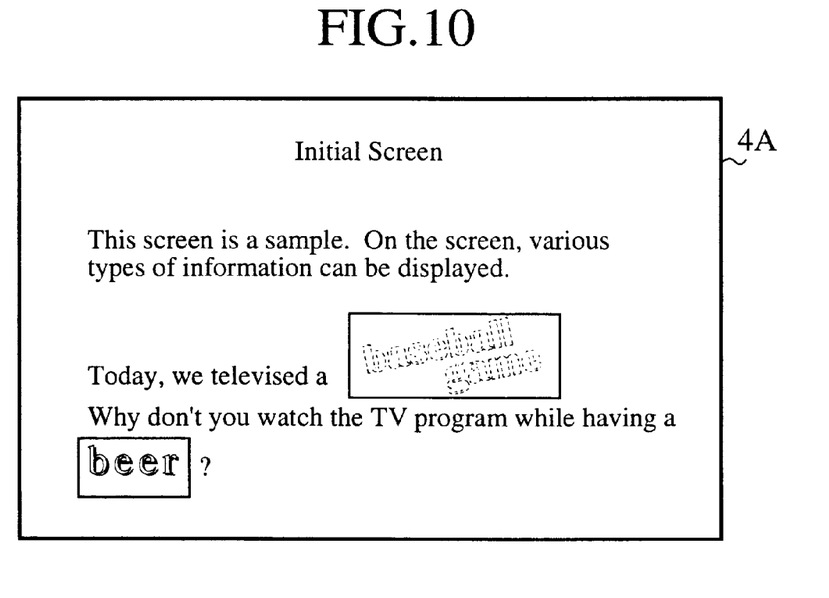
FIG. 10 is a diagram showing another example of screen display in which link portions included with the exemplary data as shown in FIG. 4 are shown in the second format.

Referring next to FIG. 9, there is illustrated a diagram showing an example of screen display in which images each indicating a hypertext link, which are included with data as shown in FIG. 4, are displayed in a first format. FIG. 10 is a diagram showing another example of screen display in which images each indicating a hypertext link are displayed in a second format.

In the first embodiment mentioned above, when the data as shown in FIG. 4 have been received and it is determined that the digital mobile telephone 8 is not available, each link portion indicating a link is shown as a text in the first format, for example, each link portion is highlighted with a dashed underline, as shown in FIG. 5. In contrast, when it is determined that the digital mobile telephone 8 is available, each link portion indicating a link is shown as a text in the second format, e.g., a bold text with a solid underline, as shown in FIG. 6. In contrast, according to a second embodiment, when it is determined that the digital mobile telephone 8 is not available, each link portion indicating a link is shown as an image corresponding to received image data, as shown in FIG. 9. In contrast, when it is determined that the digital mobile telephone 8 is available, each link portion indicating a link is shown as an image with a box drawn around the image corresponding to received image data, as shown in FIG. 10.

As previously mentioned, in accordance with the second embodiment, the information processing device can display each link portion indicating a link as an image in a specific format dependent on whether or not the digital mobile telephone 8 is available.

EMBODIMENT 3

In the above-mentioned first embodiment, a digital broadcast receiver 6 can receive data to be displayed on the display of the display unit. In accordance with a third embodiment of the present invention, data can be alternatively read out of a storage medium such as a CD-ROM or a semiconductor memory. An image and/or text corresponding to the data read out of the storage medium is displayed on a display 4A of a display unit 4.

As previously mentioned, in accordance with the third embodiment, the information processing device can read data from a storage medium such as a CD-ROM, instead of receiving data by means of the digital broadcast receiver 6. The third embodiment can offer the same advantage as provided by the first embodiment.

EMBODIMENT 4

In the above-mentioned first embodiment, the display 4A of the display unit 4 provides information for a user and detects the user's manipulation by means of the touch-sensitive panel 4B. In accordance with a fourth embodiment of the present invention, an information processing device includes a voice generating unit for converting text data into equivalent voice data and for generating a voice corresponding to the voice data through a speaker, instead of the display 4A. Further, instead of the touch-sensitive panel 4B, a voice input unit is provided to convert a user's voice, which is picked up by a microphone, into text data using voice recognition. The voice generating unit and the voice recognition can be implemented using already-proposed conventional methods.

Next, a description will be made as to the operation of the information processing device of this embodiment.

After data received by a digital broadcast receiver 6 are stored in a RAM 3, a CPU 1 furnishes the received data to the voice generating unit, so that the voice generating unit produces a voice corresponding a text included with the received data.

Only if a digital mobile telephone 8 is available, the CPU 1 further generates an additional voice notifying the user of the existence of one or more link portions each indicating a hypertext link included with the received data, and a further voice for guiding the user to manipulate the information processing device. For example, when the information processing device receives data as shown in FIG. 4, the voice generating unit provides a voice: "The title of this screen is initial screen. The screen is a sample. On the screen, various types of information can be displayed. Today, we televise a baseball game. Why don't you watch the TV program while having a beer." for the user. After that, a further voice: "There is more information on the TV program and beer. Do you need them?" corresponding to the two link portions is generated only if the digital mobile telephone 8 is available.

If the user says "baseball game" as a response to the voice from the information processing device, the voice input unit picks up the user's voice and then generates a text corresponding to the user's voice using voice recognition. The voice input unit furnishes the text to the CPU 1. The CPU 1 then determines that the link to "baseball game" was selected by the user, and controls the digital mobile telephone 8 so as to retrieve data stored at a location in a WWW site, which is identified by a URL corresponding to the link.

The CPU 1 then furnishes the retrieved data to the voice generating unit so as to cause the voice generating unit to generate a voice corresponding to a text included with the retrieved data. For example, when the CPU retrieves data as shown in FIG. 7, the voice generating unit provides a voice: "The title is baseball game. A baseball game's TV program goes on the air at 6o'clock on this channel. Please watch the TV program." for the user.

As previously mentioned, in accordance with the fourth embodiment, the information processing device can allow users to get information by voice and manipulate the information processing device by voice. Accordingly, when the information processing device of the fourth embodiment is mounted on a motor vehicle, the fourth embodiment provides an advantage of being able to make the driver concentrate his or her attention on the driving without having to perform complicated manipulations on the information processing device by hand when the digital mobile telephone 8 is not available, in addition to the advantage offered by the above-mentioned first embodiment.

EMBODIMENT 5

In accordance with the above-mentioned first embodiment, the information processing device displays an image and/or text corresponding to data received by a digital broadcast receiver 6 first. In contrast, in accordance with a fifth embodiment of the present invention, there is provided an information processing device that can control a digital mobile telephone 8 to retrieve first data to be displayed when the digital mobile telephone 8 is available without the use of the digital broadcast receiver 6. In this embodiment, the data retrieved by the digital mobile telephone 8 is stored in a RAM 3. After that, the data is read out of the RAM 3 as needed, and an image and/or text corresponding to the data is displayed.

As previously mentioned, the fifth embodiment of the present invention can offer the same advantage as provided by the above-mentioned first embodiment even when retrieving information through the digital mobile telephone 8.

EMBODIMENT 6

In the first embodiment mentioned above, a text corresponding to each hypertext link is displayed in a bold font with a solid underline when the digital mobile telephone 8 is available, and is displayed in a given font with a dashed underline otherwise. In contrast, in accordance with a sixth embodiment of the present invention, when the digital mobile telephone 8 is available, a text corresponding to each hypertext link is displayed in a blue-colored font (in this case, other texts are displayed in a black-colored font), in a double-sized font, in a blue-colored font with an underline, or in a font trimmed with something. On the other hand, when the digital mobile telephone 8 is not available, a text corresponding to each hypertext link is displayed in a black-colored font (in this case, other texts are- displayed in a black-colored font, too), in a font with a dashed underline, in an italic font, or in a dark-blue-colored font.

As previously mentioned, the sixth embodiment of the present invention offers an advantage of being able to allow the user to select a visible font in which a text corresponding to each hypertext link is displayed according to the type of a display 4A for displaying an image and/or text including the text corresponding to each hypertext link, in addition to the advantage provided by the above-mentioned first embodiment.

Industrial Applicability

As shown above, the information processing device and method of the present invention can check whether or not it is difficult to use the digital mobile telephone 8 in advance when retrieving second information associated with already-retrieved first information. Further, the information processing device and method can provide guidance to manipulate it to transmit or receive the second information associated with the first information for a user only if the digital mobile telephone 8 is available, thus preventing the user from performing extra manipulations when the user intends not to use the digital mobile telephone 8. The information processing device and method are suitable for retrieving information desired by the user while the user is driving a motor vehicle, for example.

What is claimed is:

1. An information processing device that retrieves first information by way of a first predetermined communications channel or from a predetermined storage medium and then displays a text or image corresponding to the retrieved first information on a display thereof, characterized in that said information processing device comprises:

a transmit/receive means for transmitting or receiving information by way of a second predetermined communications, channel;

a determination means for determining whether or not information can be transmitted or received through said transmit/receive means;

an enabling means for providing guidance on manipulation to cause said transmit/receive means to transmit or receive information for a user only if information can be transmitted or received through said transmit/receive means; and an information retrieving means for controlling said transmit/receive means according to the user's manipulation to retrieve second information associated with said first information by way of said second communications channel.

2. An information processing device that retrieves first information by way of a first predetermined communications channel or from a predetermined storage medium and then displays a text or image corresponding to the retrieved first information on a display thereof, characterized in that said information processing device comprises:

a transmit/receive means for transmitting or receiving information by way of a second predetermined communications channel;

a determination means for determining whether or not information can be transmitted or received through said transmit/receive means;

a display control means for, when displaying a text or image corresponding to information indicating a storage location where second information included with and associated with said retrieved first information is stored on said display, displaying the text or image corresponding to the information indicating the storage location where said second information is stored in a first predetermined format unless information can be transmitted or received through said transmit/receive means, and displaying the text or image corresponding to the information indicating the storage location where said second information is stored in a second predetermined format different from said first format otherwise;

a manipulation means that is manipulated by a user when the user selects part of the text or image displayed on said display; and a transmit/receive control means for, when said manipulation means is manipulated and the text or image displayed in said second format is selected, controlling said transmit/receive means to retrieve said second information based on the information indicating the storage location corresponding to the selected text or image.

3. The information processing device according to claim 2, characterized in that said device comprises a digital broadcast receiving means for receiving said first information transmitted thereto by a digital broadcast disposed as said first communications channel, and said transmit/receive means transmits or receives information by way of a digital mobile telephone network disposed as said second communications channel.

4. The information processing device according to claim 2, characterized in that said first and second information are written in Hyper Text Markup Language or HTML, and, when information can be transmitted or received through said transmit/receive means, said second information is displayed in a format which is the same as that of a hypertext link defined by HTML.

5. An information processing method including the steps of retrieving first information by way of a first predetermined communications channel or from a predetermined storage medium, and then displaying a text or image corresponding to the retrieved first information on a display thereof, characterized in that said information processing method comprising the steps of:

- determining whether or not information can be transmitted or received through a transmit/receive means for transmitting or receiving information by way of a second predetermined communications channel;
- providing guidance on manipulation to cause said transmit/receive means to transmit or receive information for a user only if information can be transmitted or received through said transmit/receive means; and
- controlling said transmit/receive means according to the user's manipulation to retrieve second information associated with said first information by way of said second communications channel.

6. The information processing device according to claim 1 wherein the transmit/receive status of the second predetermined communications channel is verified through an interface.

7. The information processing device according to claim 1 wherein a voice generating means is included for producing a voice corresponding to the first and second information received, and further for producing a voice for guiding the user to manipulate the information processing device.

8. The information processing device according to claim 1 wherein a voice recognition means is included for converting a user's voice into text data.

* * * * *